United States Patent [19]
Obeginski

[11] 3,936,601
[45] Feb. 3, 1976

[54] METHOD AND APPARATUS FOR ALTERING THE SYNCHRONOUS COMPARE CHARACTER IN A DIGITAL DATA COMMUNICATION SYSTEM

[75] Inventor: Carl Obeginski, South Lyon, Mich.

[73] Assignee: Burroughs Corporation, Detroit, Mich.

[22] Filed: May 28, 1974

[21] Appl. No.: 473,716

[52] U.S. Cl............. 178/22; 178/69.5 R; 179/1.5 R
[51] Int. Cl.² ...................... H04K 1/00; H04L 7/04
[58] Field of Search...... 178/22, 69.5 R; 179/15 BS, 179/1.5 R

[56] References Cited
UNITED STATES PATENTS

| | | | |
|---|---|---|---|
| 3,472,956 | 10/1969 | Glasson | 178/69.5 R |
| 3,532,985 | 10/1970 | Glomb et al. | 178/69.5 R |
| 3,546,384 | 9/1968 | Brigham | 179/15 BS |
| 3,598,914 | 8/1971 | Synnott | 179/15 AF |
| 3,649,758 | 3/1972 | Clark | 178/69.5 R |
| 3,798,378 | 3/1974 | Epstein | 178/69.5 R |

*Primary Examiner*—Maynard R. Wilbur
*Assistant Examiner*—H. A. Birmiel
*Attorney, Agent, or Firm*—G. Gregory Schivley; Michael B. McMurray; Edwin W. Uren

[57] ABSTRACT

In order to provide for a digital data transmitting system of increased security, means are provided to dynamically alter the synchronous compare character between message transmissions. Included in the data communication system are: a character general for programmatically generating a synchronous compare character; a character storage register for storing the character so generated; and circuitry for moving the synchronous character from the storage register to the data transmission circuitry. By dynamically altering the synchronous character between message transmissions, it is possible to substantially enhance the security of the data transmission system.

6 Claims, 5 Drawing Figures

METHOD AND APPARATUS FOR ALTERING THE SYNCHRONOUS COMPARE CHARACTER IN A DIGITAL DATA COMMUNICATION SYSTEM

BACKGROUND OF THE INVENTION

The field of the invention relates to synchronous digital data communications.

In a synchronous data transmission system it is required that a clock signal be transmitted with the data in order to mark the location of the data bits for the receiver. The receiver will examine the string of data bits being transmitted and when the synchronous compare character is recognized, the receiving station will lock onto the transmitting station. At present this synchronization character is standard throughout industry, i. e. a hexadecimal 1,6 in ASCII code or 3,2 EBCDIC. This character is fixed or wired into the receiving and transmitting portions of the data communication apparatus thereby making it possible for any transmitter to communicate with any receiver.

However, by making this synchronous character dynamically alterable between message transmissions, the security of a data communication systems may be greatly increased. Since without this character it will be impossible, for example, for an unauthorized terminal to gain access to a remote computer's data base and extract confidential data. Therefore, by providing dynamically alterable synchronous compare characters, the overall security of a data communications systems may be significantly enhanced.

SUMMARY OF THE INVENTION

First the invention requires that means be provided for generating or changing the synchronous compare character. This generation of a character is accomplished on programmable terminals and computers having data communications capability, programmatically. In other words, the user generates the desired character by programming the terminal in machine, assembly or a higher level language. This is essential because, in order to have the maximum security, the user must have the power to change the synchronous compare character at will.

In addition to providing a means for generating these characters, it is also necessary to have a predefined storage area for the character so generated. As mentioned before, in the prior art machines the synchronous compare character is effectively wired into the system so there is no requirement for a storage area for the character having a read/write capability. However, in order to have a dynamically alterable synchronization compare character capability it is necessary to provide either an area of memory for storing the character or a register in which it can be stored.

Along with the storage area for the synchronous compare character, it is also necessary to have a means of loading the character into the transmitter portion of the data communications device. This loading circuitry responds to a data communications program or handler so that the synchronous compare character is transmitted just prior to the actual message. After the message has been transmitted, it is then possible to generate a new synchronous character, load that character into the storage area and then transfer the character to the transmitter portion directly ahead of the next message to be transmitted. Of course, it is not necessary to change the synchronous compare character between each message transmitted. This depends basically on the degree of security that is required in the system.

The receiving station must be aware of what the synchronous compare character is which can be accomplished in a number of ways. First, it is possible to predefine which synchronous compare characters will be used at certain specified times. Also, it is possible to use the same algorithm or mathematical formula in the transmitting station and the receiving station to generate the synchronous compare characters. Another method that may be used is to have the new synchronous character be included in the data message being transmitted. In any event it is necessary to have some means for providing the receiving station with the synchronous compare character.

Therefore, the receiving station will have either the means for generating the synchronous character or means for loading the synchronous character into a predefined storage area for comparison with the data bits being received over the transmission lines. The receive logic of the receiving station will compare the data bit stream being received from the transmitter to the synchronous compare character in order to determine when the synchronous character has been received. After the character has been recognized in the bit stream, the receiver will "lock on" and treat each group of eight bits as a data word.

DETAILED DESCRIPTION OF THE INVENTION

Figure 1:
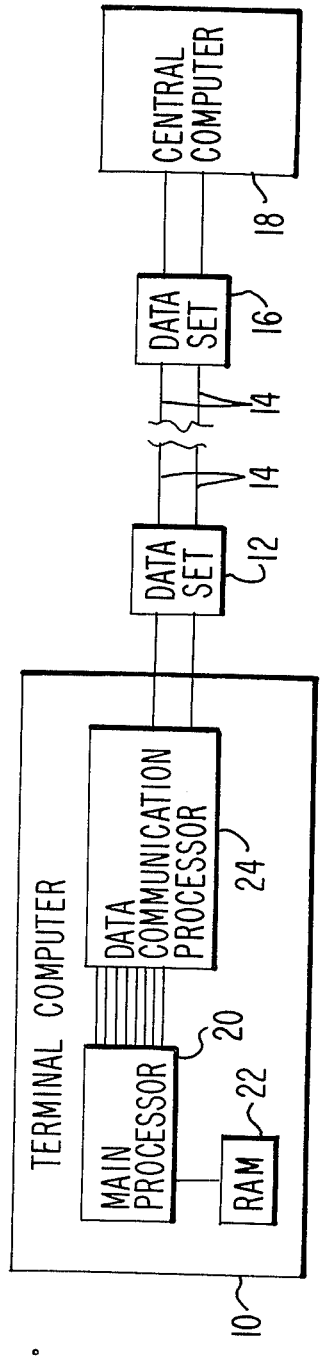
FIG. 1 is a block diagram illustrating a data communications system.

As an aid in describing the preferred embodiment of the invention, FIG. 1 illustrates a typical data communications system. The terminal computer 10 is attached to a first data set 12. This data set 12 is in turn connected by means of the transmission lines 14, such as telephone lines or microwave links, to the second data set 16. The second data set 16 serves to collect and transmit data signals to the central computer 18. Many data communication systems are much more complex then the one shown in FIG. 1. For example, a plurality of terminal computers can be connected to a central computer or a system can consist of a group of terminal computers communicating only with each other. Similarly, a data communication systems can consist of a number of central computers communication with one another or a plurality of several computers communicating with one or more terminal computers. However, the preferred embodiment of the invention will be discussed within the context of the data communication system shown in FIG. 1.

Figure 2:
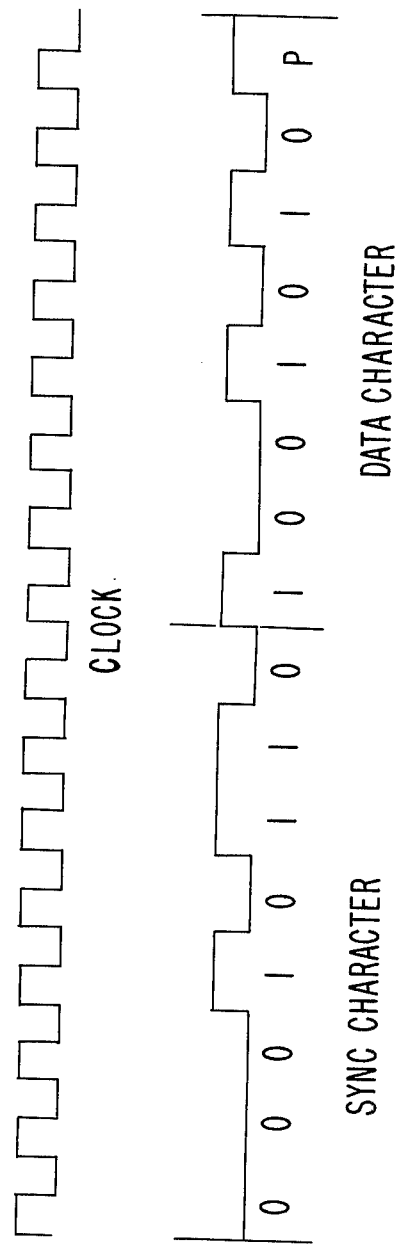
FIG. 2 is a chart illustrating a clock signal and a data signal.

In FIG. 2 is illustrated a typical bit stream that would appear in a synchronous environment. Since there are no start or stop bits delimiting the message, as in an asynchronous transmission, it is necessary to provide a synchronizing character to signal the receiver that the following bits represent a data character. The synchronizing character also serves to indicate which is the first bit of the first data character and the clock signal serves to define the limits of the following bits. The example of the synchronous character shown in FIG. 2 is the standard ASCII synchronous compare character which can be represented by a hexadecimal 1 and a hexadecimal 6.

The terminal computer 10 of FIG. 1 is comprised of two basic elements. The first element of the terminal computer is the main processor 20 with its associated random access memory 22 and the second element of the terminal computer is the data communications processor 24. It is the function of the data communications processor 24 to perform all the operations necessary for the terminal computer to communicate with other devices in a data communication environment. The preferred embodiment of the terminal computer is represented by the Burroughs TC-3500 which is described in detail in the Burroughs publication L-8000 Mini-Computer Technical Manual Form No. 1060498.

Figure 3:
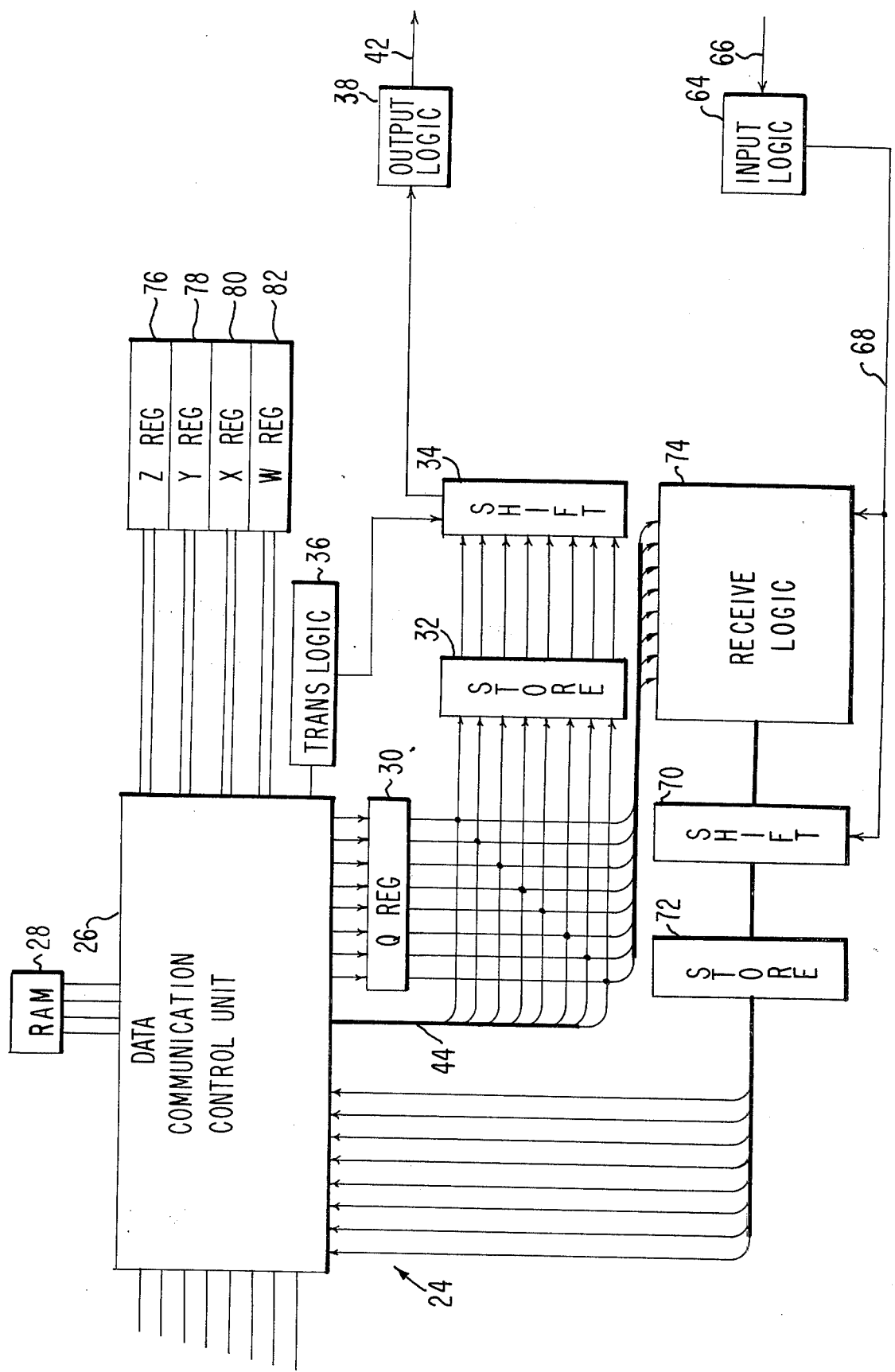
FIG. 3 is a block diagram of the data communication processor of a terminal computer.

A detailed block diagram of that portion of the data communications processor 24, as it relates to the invention, is set forth in FIG. 3. The data communication control unit 26 of the data communication processor 24 is essentially a self contained microprogrammed computer including logic circuits and an arithmetic unit wherein the microprograms are stored in the random access memory (RAM) 28. In the preferred embodiment of the invention, the data communication control unit 26 does not have a random access memory for storing data but uses the random access memory 22 under control of the main processor 20 of FIG. 1 for this purpose. Ths user programs utilizing the data communication network are executed by the main processor 20 of the terminal computer 10 and when its necessary to either transmit or receive a message the main processor 20 will cause the data communication processor 24 to perform the appropriate data communications functions. By providing a separate data communications processor 24 within the terminal computer 10 it is possible to perform data communication operations concurrently with the main processor's 20 execution of the user's program thereby increasing the overall efficiency of the system.

When, in the preferred embodiment of the invention, it is desired to transmit a message the main processor 20 will cause the data communication control unit 26 to generate the desired synchronous compare character, utilizing the micrologic stored in the RAM memory 28. One means of generating the synchronous control charcter is to use the COBOL statement "SET D-C SYNC-CHAR TO at H H at" in the user's program. The H's in this statement are variables that represent hexadecimal numbers.

The synchronous compare character so generated is stored in the Q register 30. The data communications control unit 26 then causes the contents of the Q register 30 to be loaded into the holding register 32. From the holding register 32 the synchronous word is transferred to the transmission shift register 34 where, under control of the transmission logic 36, it is converted into a serial bit stream. This bit stream passes through output logic 38 to the data set 12 of FIG. 1. After one or more synchronous compare words have been transmitted to the data set, the data communication control unit 26 will transmit the first data word of the message to be transmitted from the main processor 20 of FIG. 1 through data bus 44 to the holding register 32. In the same manner as the synchronous compare word, the data word will be converted to bit serial form in the register 34. The data word, in bit serial form, is transmitted over the line 42 to the data set 12 of FIG. 1. In this manner each word of the message will be transmitted to the data set 12.

Figures 4, 5:
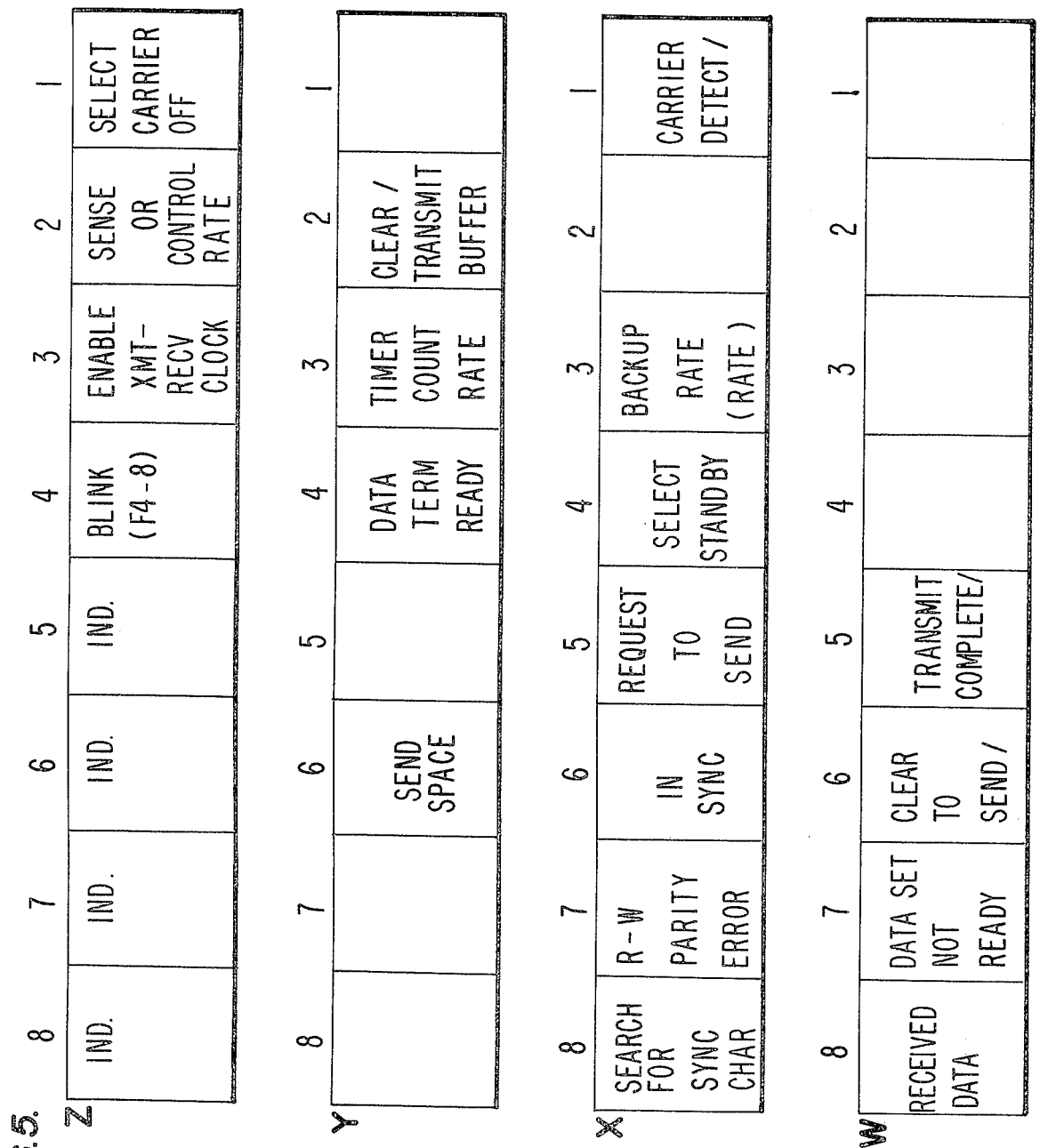
FIG. 4 is a logic flow chart illustrating a method of dynamically altering a synchronous compare character.
FIG. 5 is a detailed diagram of the Z, Y, X and W registers of the data communications processor of FIG. 2.

The general nature of this process is illustrated in the flow chart presented in FIG. 4. The first step 46 in transmitting a message is to define the first synchronous character and place it in the Q register 30 of FIG. 3. The first synchronous character is then transmitted 48 by means of the circuitry shown in FIG. 3 directly followed 50 by the actual data or message. The terminal computer 10 then waits 52 for a message received character and if the response is negative, the data communication program branches to the error routine 54. When another message is to be transmitted, the user's program contained with the main processor 20 will determine if a new synchronous character is required 56. If the new character is required, it will be generated 58 and placed in the Q register 30. The new synchronous character is then transmitted 60 followed directly by the data to be transmitted 62. If a new synchronous character is not required, then the synchronous character that is already resident in the Q register 20 will be transmitted as shown in step 60 of the flow chart followed directly by the message. Thereafter, the general procedure contained in the logic boxes 52 through 62 will be performed until there are no more messages to be transmitted.

The data communication processor 24 as illustrated in FIG. 3 is also effective for receiving synchronous messages wherein the synchronous compare character is variable. The bit stream representing the message being transmitted is received in the input logic 64 from the data set 12 over line 66. This bit stream is then transmitted by means of line 68 to the receive shift register 70. Then the receive logic will compare the received character to the Q register 30. If the two characters are equal, the contents of the shift register is transferred in parallel to the holding register 72. The contents of the holding register 72 forms one of the inputs to the control unit 26. The contents of the Q register 30, which contains the synchronous compare character, is also used as input to the receive logic 74. The receive logic compares the input from the input logic 64 to the synchronous compare character in the Q register 30. If the character is recognized, the data communication control unit will then cause the receive logic to transmit the following bits in word form through the data communication control unit 26 to the main processor 20. In some applications it is considered desirable to identify more than one synchronous compare character before accepting the bit stream as valid data in order to increase the reliability of the system. This approach may be microprogrammed into the data communication processor 24. Therefore, by changing the contents of the Q register 30 to correspond with the anticipated synchronous control character from the transmitting device, it is possible to provide for significantly increased data communication security since an unauthorized device will not be able to communicate with the terminal 10.

In the preferred embodiment of the invention the data communication control unit 26 does not have a random access memory of its own but utilizes the random access memory 22 of the main processors. However, in order to facilitate efficient data communication the preferred embodiment has associated with it four registers as shown in FIG. 3: the Z register 76, the Y register 78, the X register 80 and the W register 82. Each of these registers contains an eight bit word indicating the relative status of the data communication processor 24. The contents of these registers are illustrated in FIG. 5 of the drawings. The contents of these registers are set and read by means of the microprograms stored in the RAM memory 28 of the data communication control unit 26. In describing the contents of these registers only those flags that are relevant to synchronous transmission or receiving will be discussed.

Starting with the Z register Z5-Z8 are used to control the channel indicator lamps in the terminal computer 10. Z3 enables the internal transmitter and receiver clock and Z2 is a control rate flag. In the Y register, bit Y6 indicates that a space should be transmitted; bit Y4 indicates when the data terminal is ready; Y3 is used to govern the time count rate; and bit Y2 indicates the status of the transmitted buffers. In the X register, the X8 bit, when set, causes the synchronous receiver logic 74 to initiate a "sliding window" search of the received bit stream for a synchronous compare character that matches the contents of the Q register 30. In the preferred embodiment of the invention the data communication processor 24 must receive at least one synchronous compare character for the data communication processor to accept data. Once one synchronous character has been received and recognized, the X6 bit will be switched on thereby indicating that the data communication processor is ready to receive data. The X5 bit is set by the program and indicates a request to send is present. The bits X4 and X3 serve to indicate the data rate and bit X1 is simply a carrier detect flag. In the last register, the W register, W8 indicates when data has been received. W7 indicates when the data set 12 is not ready and W6 is a clear to send signal. The bit W5 indicates when a transmission is complete and bits W4-W1 indicate the status of the various input output buffers.

The invention has been described in terms of the preferred embodiment but it will be understood that other implementations of the invention may be made without departing from the scope of the invention as claimed herein.

What is claimed is:

1. In an apparatus for transmitting digital data in a synchronous mode, the improvement comprising:
   character generating means for generating a plurality of different synchronizing characters in a preselected nonrepetitious pattern thereby dynamically altering said synchronizing characters;
   storage means for storing at least one of said synchronizing characters;
   transmitting means for transmitting digital data and at least one of said synchronizing characters;
   means for transferring at least one of said synchronizing characters from said storage means to said transmitting means; and
   said dynamically alterable synchronizing characters preventing unauthorized interception of the digital data transmitted by the transmitting means.

2. A method for transmitting digital data to a receiving apparatus in a synchronous mode comprising the steps of:
   generating a first synchronous character;
   transmitting said first synchronous character to the receiving apparatus;
   transmitting a first message in digital form to the receiving apparatus; and
   generating different synchronous characters in a preselected nonrepetitious pattern to provide dynamically altered characters to precede future message transmissions thereby preventing unauthorized interception thereof.

3. The method of claim 2 wherein a predetermined number of said synchronous characters are transmitted before transmitting said messages.

4. The method of claim 2 including the step of transmitting a predetermined number of messages after said step of transmitting said first message before generating subsequent synchronous characters to precede future message transmissions.

5. The method of claim 4 wherein a predetermined number of said synchronous characters are transmitted before transmitting said message.

6. The method of claim 5 including the additional step of including in each of said messages transmitted sufficient information to the receiving apparatus to enable the receiving apparatus to generate the next synchronous character.

* * * * *